United States Patent [19]

Belew

[11] 4,284,034
[45] Aug. 18, 1981

[54] BIOCENTRIFUGE SYSTEM CAPABLE OF EXCHANGING SPECIMEN CAGES WHILE IN OPERATIONAL MODE

[75] Inventor: Robert R. Belew, Huntsville, Ala.

[73] Assignee: The United States of America as represented by the Administrator of the National Aeronautics and Space Administration, Washington, D.C.

[21] Appl. No.: 145,273

[22] Filed: Apr. 30, 1980

[51] Int. Cl.³ .............................................. A01K 1/00
[52] U.S. Cl. ........................................ 119/17; 119/18
[58] Field of Search ...................... 119/15, 21, 29, 96, 119/17, 18; 233/26; 434/34

[56] References Cited

U.S. PATENT DOCUMENTS

| 3,092,075 | 6/1963 | Hosokawa | 119/15 |
| 3,126,868 | 3/1964 | Ishibashi | 119/21 |
| 3,136,075 | 6/1964 | Brian | 434/34 |
| 3,635,394 | 1/1972 | Natelson | 233/26 |

Primary Examiner—Hugh R. Chamblee

Attorney, Agent, or Firm—Joseph H. Beumer; John R. Manning; Leon D. Wofford, Jr.

[57] ABSTRACT

A biocentrifuge (10) is provided as part of a bioresearch centrifuge system (1) for subjecting caged animals to long term centrifugal forces that create gravity conditions aboard orbiting spacecraft. The centrifuge comprises a generally circular, rotatably mounted frame carrying a plurality of removable and replaceable cages (40) for the animal specimens. Pairs of opposing cages may be removed from the frame while it is rotating, by means of a cage exchanger (20) which rotates concentrically within the centrifuge and the speed of which is controlled independently of the frame speed. An image rotator (17) is provided for selective observation of the rotating animals. The system further includes a waste conveyor system (70), a food supply system (80) and a water supply system (90) for each cage for creating a life sustaining environment so that the animals can live in the rotating centrifuge for extended periods. The rotating cage exchanger can also be used to selectively remove containers from various other centrifuges or other rotatable frame structures.

26 Claims, 12 Drawing Figures

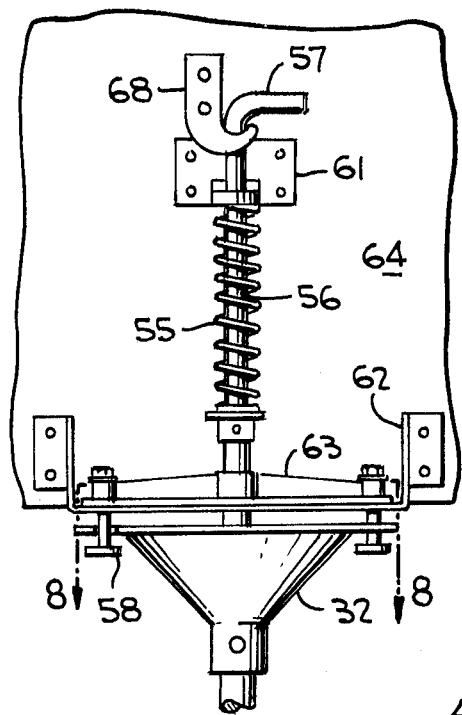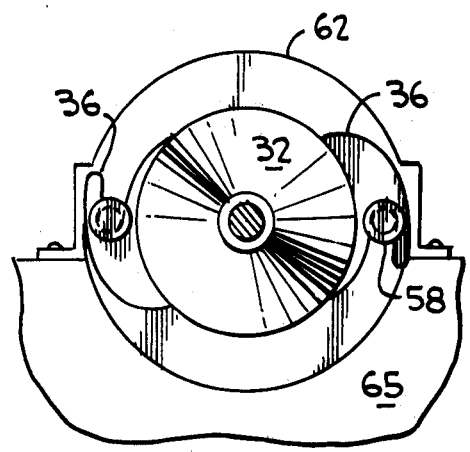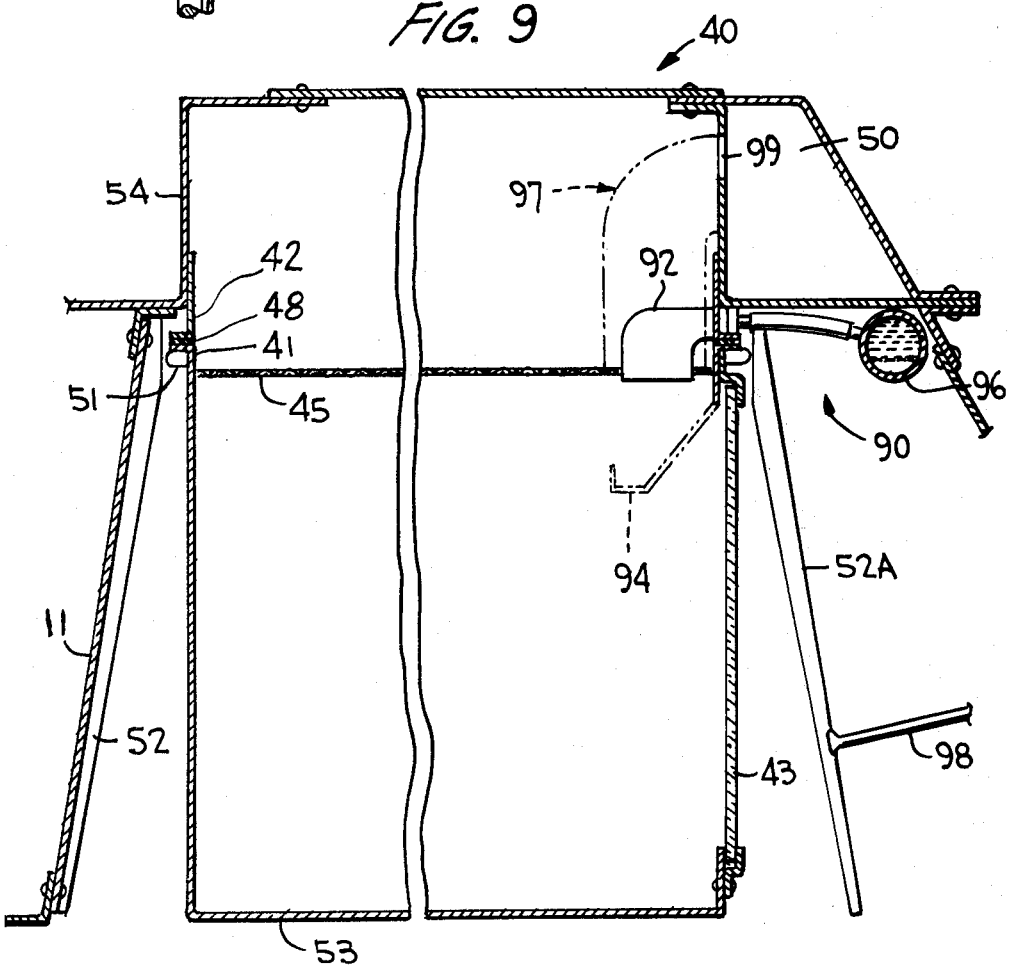

BIOCENTRIFUGE SYSTEM CAPABLE OF EXCHANGING SPECIMEN CAGES WHILE IN OPERATIONAL MODE

DESCRIPTION OF THE INVENTION

Origin of the Invention

The invention described herein was made by an employee of the United States Government and may be manufactured and used by or for the Government for government purposes without the payment of any royalties thereon or therefore.

TECHNICAL FIELD OF THE INVENTION

The present invention generally relates to a biocentrifuge system capable of exchanging specimen cages while in operational mode. More specifically the invention relates to a biocentrifuge system comprising a centrifuge carrying a plurality of specimen cages and an independently rotatable cage exchanger capable of selectively removing cages from the centrifuge while it is in its rotating operational mode.

Background Art

On many of the life science missions planned for the United States Space Shuttle and Spacelab over the next twenty years, it is highly desirable that medical and scientific biological research projects be successfully carried out. Additionally, it has been found desirable to provide structure for creating long-term artificial gravity conditions for individually caged animal specimens aboard these and other orbiting spacecraft. Finally, it has been considered desirable to selectively remove individually caged animals from an artificial system for observation without affecting the movement or conditions to which the specimens which remain within the artificially created system are subjected. Accordingly, apparatus which is capable of selectively removing cages from a rotating biocentrifuge without affecting the motion of the biocentrifuge or the cages and specimens which remain attached thereto is preferred.

The prior art discloses several devices for subjecting animals to artificial conditions in space as well as a number of devices in which animals are placed in rotating systems, although these latter systems are not utilized to create artificial conditions and are not utilized in space.

BLACKBURN et al, U.S. Pat. No. 3,521,619, discloses a system for studying accelerative effects upon animals living in a low gravitational environment. The system includes a water filled centrifuge housing specimens to be tested under a predetermined applied acceleration.

QUATTRONE et al, U.S. Pat. No. 3,367,308, discloses an exposure system for studying the toxicological aspects of artificial atmosphere upon certain animals.

WIERENGA, SR., U.S. Pat. No. 3,124,101, discloses a cage assembly for housing a plurality of animals. The assembly automatically feeds and waters the animals and maintains their cages in a sanitary condition. This assembly can be effectively used as a chicken or hen house.

SIPTROTT, U.S. Pat. No. 2,969,040, discloses an assembly of individual hen carrying cages which move in a continuous circular path, the cages being surrounded by water troughs.

LIPPI, U.S. Pat. No. 3,707,949, discloses a drinking water delivery system for caged fowl which includes a supply pipe, delivery pipe and watering cup.

DOWNING, U.S. Pat. No. 3,866,576, discloses a hopper feed assembly for animals held in cages which comprises a generally tubular body having an opening along a side wall portion.

LOVITZ, U.S. Pat. No. 3,589,338, discloses a test tube or bottle-type feeder which can be used for liquid or granular food material, the feeder including a downwardly directed mouth plugged by a stopper.

STONE, JR., U.S. Pat. No. 3,585,968, discloses a conveyor assembly for disposing of waste droppings from individual animal cages by a system which includes sheet material rotatably wound about supply and takeup reels.

SHOCKLEY, JR., U.S. Pat. No. 3,900,006, discloses a waste disposal conveyor assembly comprising conveyor belts underlying the floors of cage units, the belts being rotated about end rollers and driven by motors to periodically move the droppings towards a waste collection pit.

KESSELL et al, German Pat. No. 2,357,545, discloses a centrifuge in which containers attached to the centrifuge are replaced by an elevator assembly.

DISCLOSURE OF THE INVENTION

It is an object of the present invention to provide a new and improved biocentrifuge system in which a biocentrifuge carries a plurality of removable and replaceable cages which can be removed from the biocentrifuge by a cage exchanger while the biocentrifuge is rotating in its operational mode.

Briefly, the above and other objects, features and advantages of the present invention are attained in one aspect thereof by providing a centrifuge system comprising a frame having a plurality of containers removably and replaceably mounted about its periphery. The frame has a stationary inoperative mode and a rotating operational mode. The system includes a rotatable device positioned within the rotatable frame, the device including means for removing and replacing at least one of the containers from the frame while the frame is rotating in its operational mode.

Additionally, the above and other objects, features and advantages of the present invention are attained in a second aspect thereof by providing a biocentrifuge system for subjecting animals to artificial conditions in space. The system comprises a frame having a plurality of cages removably and replaceably mounted about its periphery and a rotatable cage exchanger which is positioned within the frame. The frame has a stationary inoperative mode and a rotating operational mode. The cage exchanger comprises means for selectively removing and replacing at least a predetermined one of said cages from the frame while the frame is rotating when in its operational mode.

BRIEF DESCRIPTION OF THE DRAWINGS

The above and other objects, features and advantages of the present invention will be more fully apparent to those of ordinary skill in the art to which this invention pertains from the following detailed description, when considered in connection with the accompanying drawings, in which like reference characters designate like or corresponding parts through the several views, and wherein:

FIG. 6 is a perspective view of the cage latching device of FIG. 5 after engagement with the cage exchanger;

FIG. 7 is a bottom perspective view of the cage latching device and cage exchanger shown in FIGS. 5 and 6;

FIG. 9 is a plan view of the liquid supply system used with the cages of the biocentrifuge system;

DETAILED DESCRIPTION OF THE PREFERRED EMBODIMENT

Figure 1:
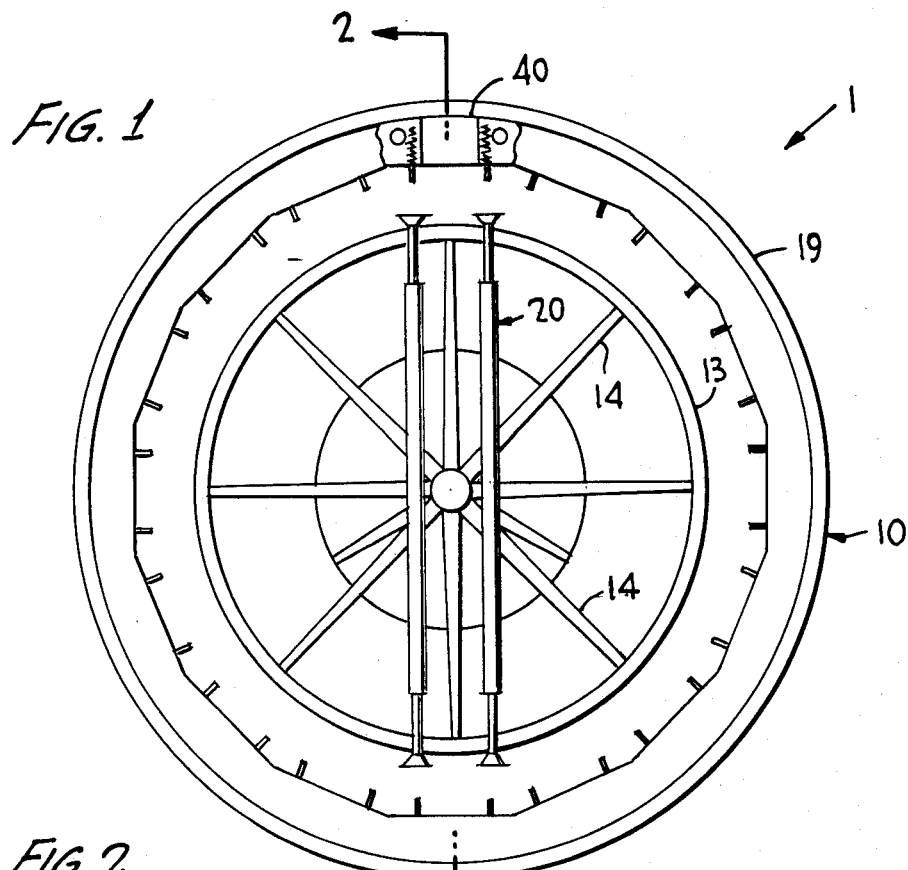
FIG. 1 is a top plan view of the biocentrifuge and cage exchanger system formed in accordance with the present invention.

Referring now to FIG. 1, a biocentrifuge system 1 is shown comprising a biocentrifuge 10 having a plurality of specimen cages 40 removably and replaceably attached about its periphery. As one example of such a system 16 specimen cages are positioned about the circular periphery of the centrifuge frame, which frame has an outer diameter of approximately 150 inches. The centrifuge is supported by a plurality of support legs 12, which can be arranged, e.g. as three support legs spaced at 120 degree intervals. The centrifuge frame includes inner ring 13 positioned at the end of a plurality of radially extending support spokes 14 and peripheral outer cage holding stability ring assembly 19. Motor 38 is attached to one support leg and gear 39 to a plurality of spokes 14 for driving the biocentrifuge in rotating fashion, as illustrated in FIG. 2.

Figure 2:
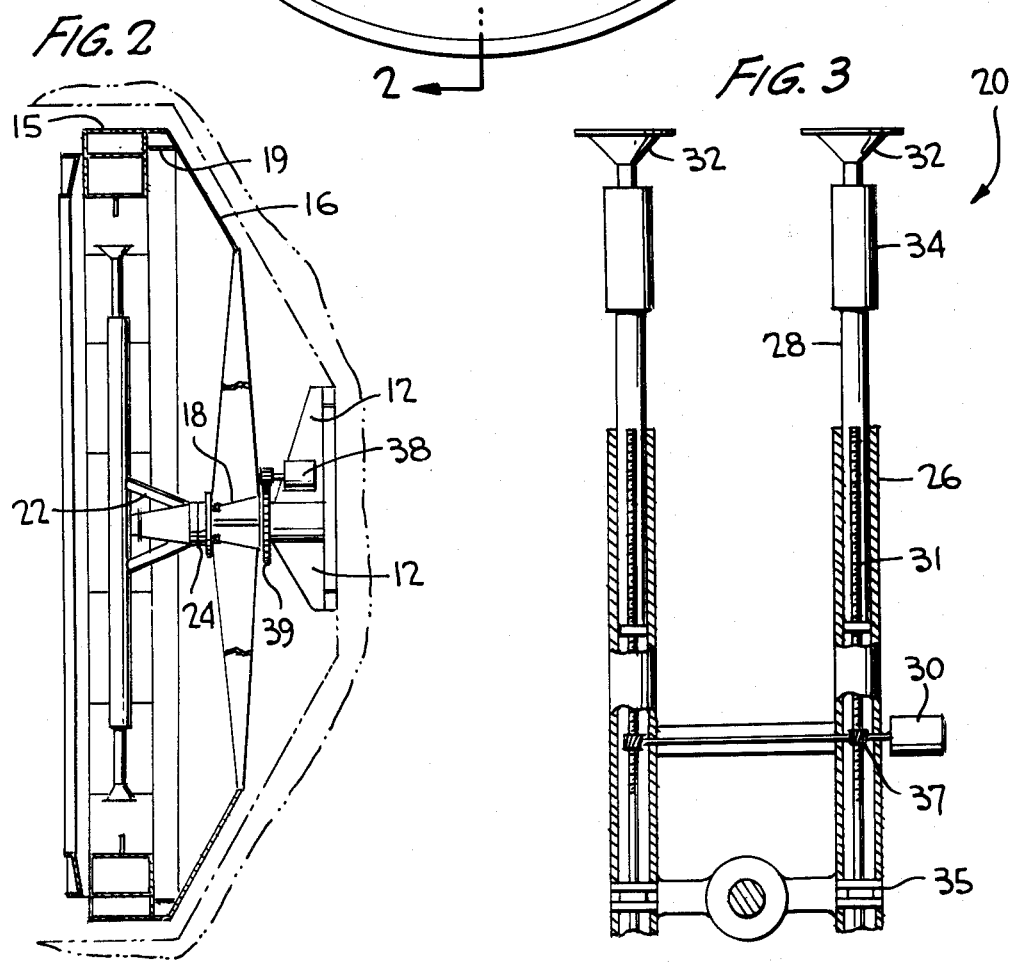
FIG. 2 is a side plan view of the biocentrifuge cage exchanger system taken along line 2—2 of FIG. 1.

The centrifuge also includes cylindrical section 15, as best illustrated in FIG. 2, which is supported by substantially conical support structure 16, and a spin axle hub assembly 18 for rotatably driving the centrifuge. Image rotator 17, which may include a plurality of prisms, is aligned with the spin axis of the centrifuge and may be structurally supported from either the hub of the centrifuge or the spacecraft floor. The specimen cages can be removed by an animal specimen cage exchanger 20, which has a spin axle hub assembly 22 rotatably connected to the hub assembly of centrifuge 10 by clutch assembly 24.

Figure 3:
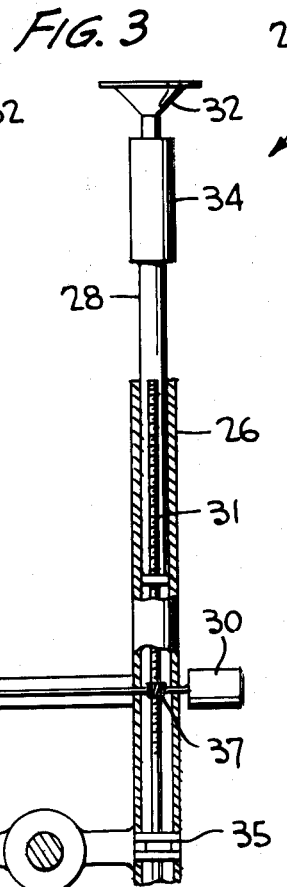
FIG. 3 is a partially cut away perspective view of the cage exchanger illustrated in FIG. 1.

The clutch assembly requires positive locking capability at every spaced radial position at which a cage is located about the periphery of centrifuge 10 (e.g., 16 equally spaced positions). Such locking capability can be provided in conventional fashion, e.g. teeth or detents. This ensures positive radial alignment between the cage exchanger and the centrifuge during removal and replacement of the cages. The cage exchanger, as best illustrated in FIG. 3, includes a pair of elongated exchanger arms 28 supported by exchanger arm supports 26. The exchanger arms are driven by drive motors 30 and drive screws 31. Each of the arms has a central portion adjacent its axis and two opposed peripheral ends. Each of the ends comprises a cage removal cone 32 driven by cage removal cone drive assembly 34. Worm gear 37 connects drive motor 30 to drive screw 31, and thrust bearings 35 are provided adjacent the spin axle exchanger hub assembly. Around the outer periphery of the cage removal cones a removal pin capture flange 36 is integrally connected, as best illustrated in FIG. 7. The capture flanges have opposed recesses at their ends for surrounding removal pins 58, as described in greater detail hereinafter.

The hub assembly of the cage exchanger is supported from the centrifuge hub assembly. Spin power is transmitted through clutch 24 from centrifuge hub assembly 18, this low torque clutch providing for low acceleration spin-up. Spin-down is achieved by applying friction to a braking wheel (not shown). The braking wheel take the conventional form of a friction pad, shoe, band or similar device which is operated by lever, solenoid or other known device, and is applied to the periphery of the driven element to slow it down. Exchanger arm support structure 26 houses the arm drive mechanism comprising motor 30 and drive screw 31. All four exchanger arms 28 are mechanically interconnected and move in unison, driven by a single drive motor 30. For the purposes of most of the drawings, only the upper portions of each of the arms are shown in detail. It should be noted, however, that the lower portions at the opposite peripheral ends of the arms are indentically formed as mirror images thereof.

Figure 12:
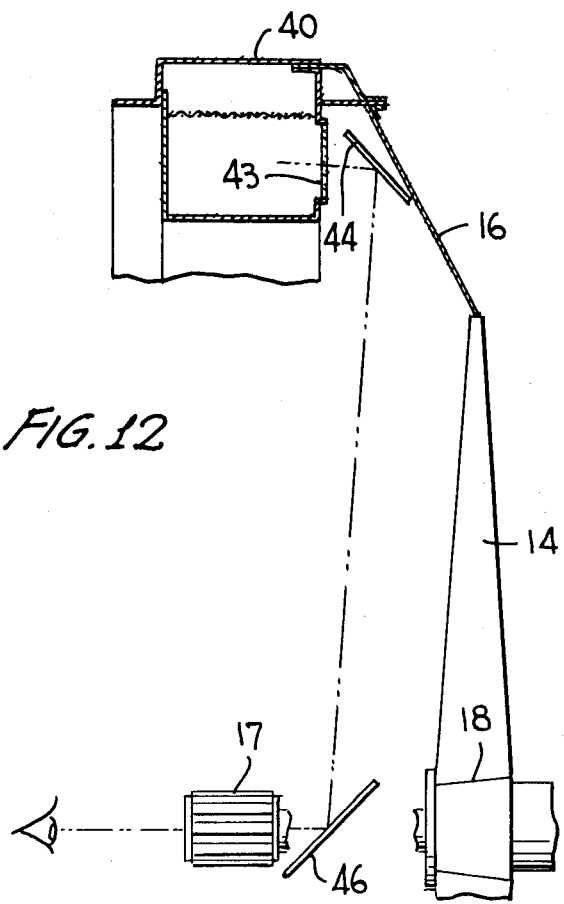
FIG. 12 is a side view of the optical observation system used as part of the biocentrifuge system.

A specimen cage 40 is shown in greatest detail in FIG. 9. It comprises a transparent viewing window 43, preferably formed of plastic, along one wall, floor grid 45, cage ceiling 53, and bottom flange 41. An optical cage mirror 44 (best seen in FIG. 12) acts in conjunction with cage window 43, rotating mirror 46 and image rotator 17 to provide selective observation of predetermined animal specimens. Bottom flange 41 is pressed against a matching gasket flange assembly 42 to form a seal. Fresh air enters into each cage through air supply duct 50, aperture 99 and delivery duct 97, and then circulates through the floor grid and into an adjacent compartment so that it may be filtered out into the spacecraft atmosphere. Although not illustrated, an access door can be placed either on ceiling 53 or one cage side (but not on cage end panel 64, as it is utilized in conjunction with latches 56, as described in greater detail hereinafter). Image rotator 17 is mounted concentric with the biocentrifuge spin axis, as best illustrated in FIG. 12.

The cage further includes aligning bar 51, cage aligning guide 52, which is attached to side panel 15, and z-ring 54. All of these elements are best illustrated in FIG. 9.

Figure 5:
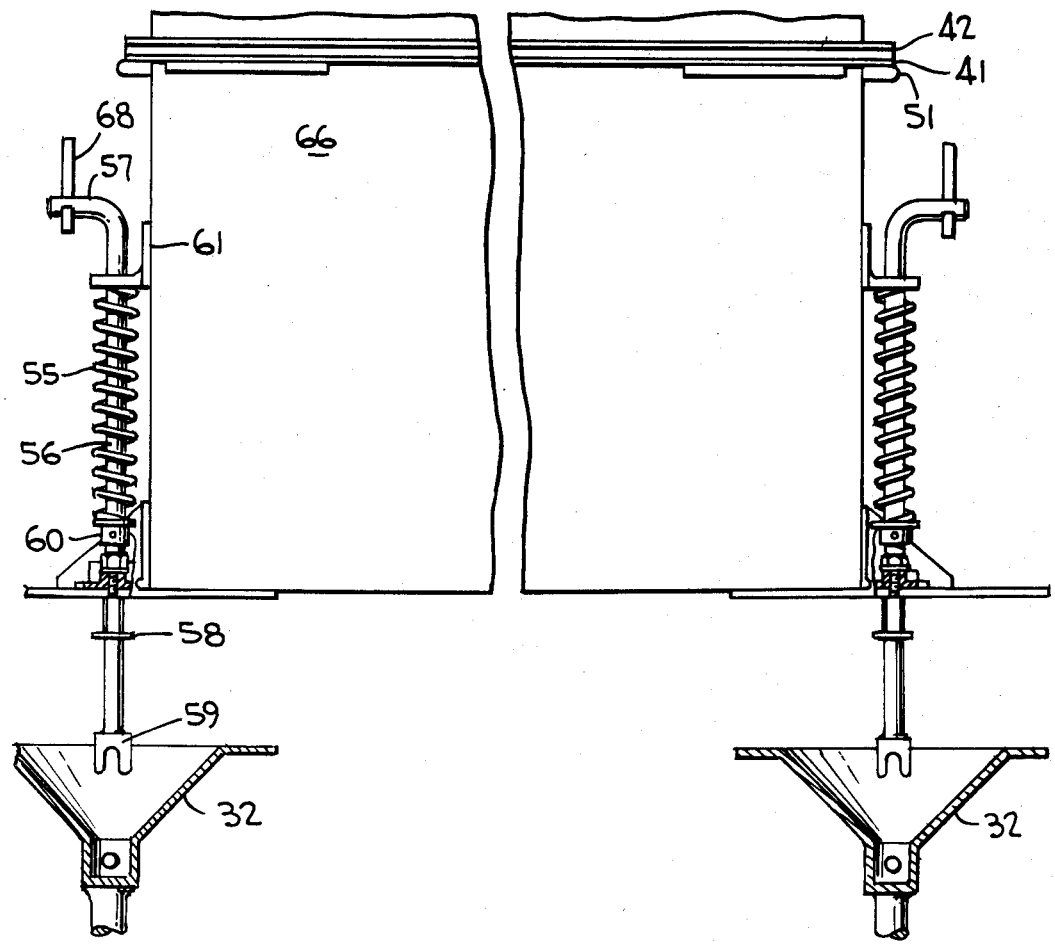
FIG. 5 is a partially cut away perspective view of a biocentrifuge cage latching device prior to engagement with the cage exchanger of FIG. 3.
Figure 8:
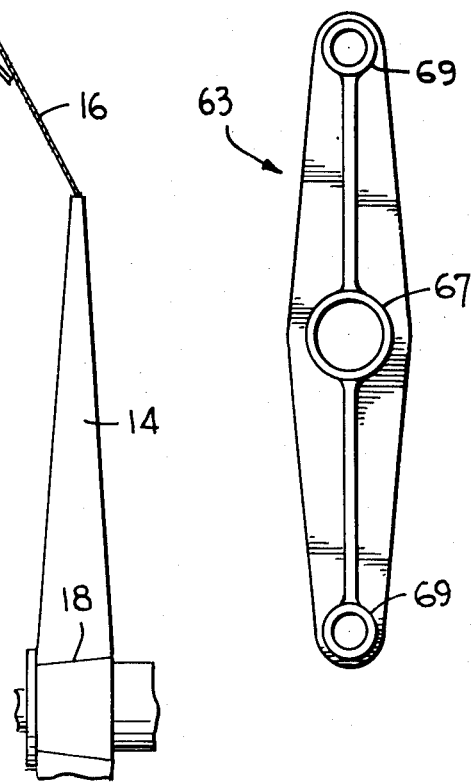
FIG. 8 is a cross sectional view taken along line 8—8 of FIG. 6.

Two spring loaded latches 56 secure the animal specimen cages 40 to centrifuge 10, as illustrated in FIG. 5. The latches are spring biased by spring 55 and each comprises latch hook 57 at one end and slotted latch head 59 at the opposite end. Removal pins 58 terminate adjacent to and are aligned with slotted latch head 59. The other end of each pin 58 is threaded and terminates adjacent collar 60, such other end being capped by a conventional washer and nut arrangement. The slotted heads 59 engage the base of cage removal cones 32 when the cages are to be removed or replaced. The latches further comprise collars 60 and are mounted on the cage by lower bracket supports 61, which together with upper support brackets 62, are attached to cage end panels 64, and pin and latch support bars 63. Cage side panels 66 are perpendicular to end panels 64. One end of each latch 56 terminates in a latch hook 57 which releasably engages latch keeper 68 attached to the centrifuge frame. Each pin and latch support bar 63, as best illustrated in FIG. 8, comprises a pair of relatively small apertures 69 and relatively large central aperture 67, for receiving pins 58 and latch 56, respectively. Upper support brackets 62 include similar apertures for pin and latch passage.

Each of the latches provides an approximately 15-20 pound force for holding each cage in place. The latches can move either longitudinally or rotationally to assist in cage removal or replacement. The cage is removed in the following fashion: cage removal cone 32 advances to mate with slotted head 59 and to in turn drive latch hook 57 away from latch keeper 68; the cone and latch then rotate approximately 90 degrees together to clear the hook from the keeper, while pin capture flanges 36 are simultaneously properly positioned so that their recesses generally surround and engage removal pins 58, as best illustrated in FIG. 7; and cage exchanger removal arms 28 are then retracted, such that pin capture flanges 36 pull pins 58 with them to withdraw a cage from the centrifuge frame. In order to replace and latch the cage, the above steps are simply repeated, but their sequence is reversed.

A water or other liquid supply system 90 is illustrated in FIG. 9. This system includes a toroidal water header 96, drinking pot 92 and sanitary guard 94. This arrangement allows for a constant supply of drinking water to be externally supplied to the cage. A brace 98 stabilizes cage aligning guide 52A, which has substantially the same configuration as guide 52.

Figure 4:
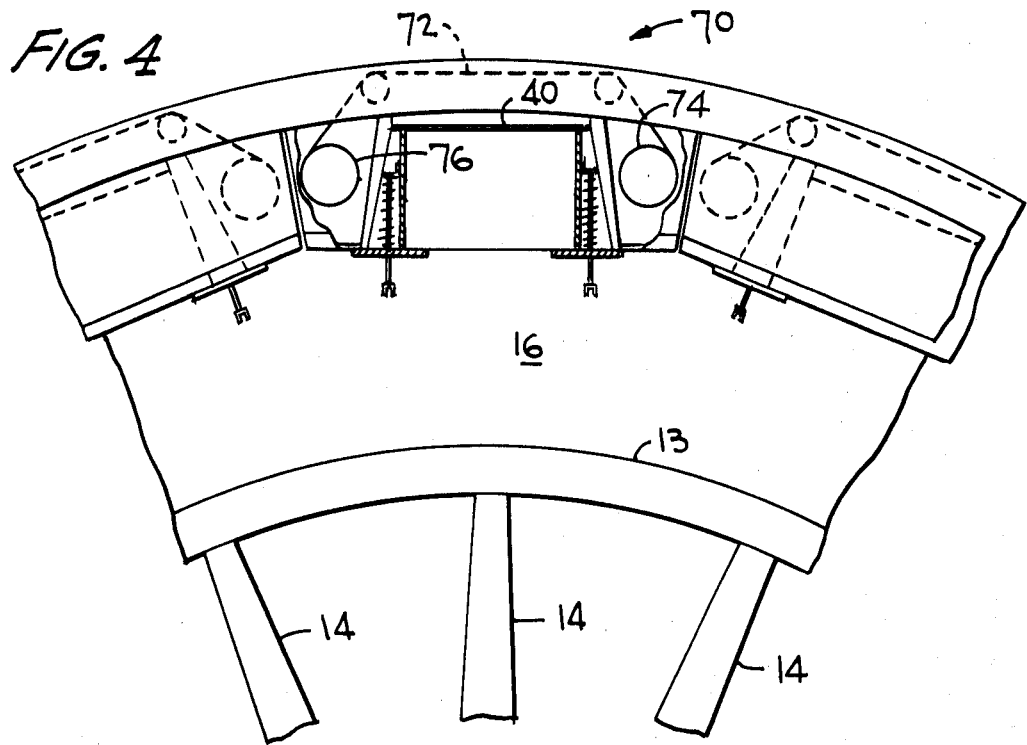
FIG. 4 is a partially cut away top plan view of a waste collecting system forming part of the biocentrifuge system.

A waste collection system 70 is best illustrated in FIG. 4. The system collects waste on belt 72 which is supported beneath cage floor 45. Animal droppings pass through the floor and are collected on the belt, which is formed of a screen-like grid. The belt is rolled from waste collector dispenser 74 and advanced intermittently to convey waste into collector storage compartment 76. Air discharging from the cage accumulates moisture from the belt and material and discharges it through a filter (not illustrated) into the spacecraft atmosphere.

Figure 10:
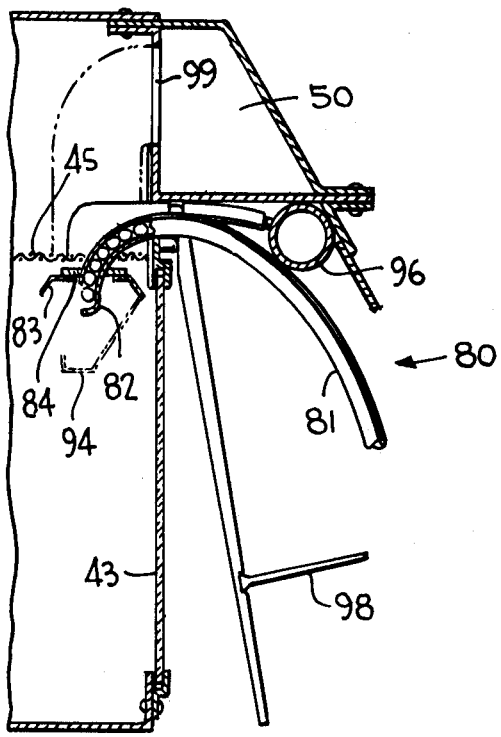
FIG. 10 is a plan view of one embodiment of a food delivery system used with the cages of the biocentrifuge system.

Several biocentrifuge pellet feeders can be used in conjunction with the biocentrifuge system. The first embodiment, illustrated in FIG. 10, shows a food dispensing system 80 comprising a food pellet delivery tube 81 which terminates in a food dispenser 82 having a partially capped end. This dispensing end is capped so that pellets will be prevented from exiting from the tube under the force of artificial gravity only and will require the additional positive force of a specimen pulling on the pellets 85. Delivery tube 81 is supplied from a suitably configured hopper (not shown). This system also includes a food pan 83 and a food pan bottom closeout disc 84.

Figure 11:
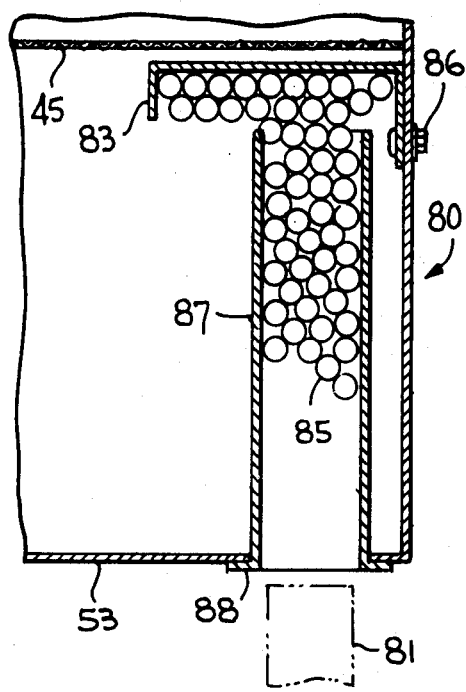
FIG. 11 is a plan view of a second embodiment of a food delivery system used with the cages of the biocentrifuge system.

An alternate embodiment of a food dispensing system 80 is illustrated in FIG. 11. This system includes a feed hopper 87 which is attached to cage ceiling 53 and supplied by food pellet delivery tube 81. The hopper includes flange 88 which overlies the cage ceiling. Food pellets 85 are placed in the hopper and rest in feed pan 83, which is attached to the cage by feed pan attachment assembly 86. The feed hopper is resupplied by dumping additional pellets from a synchronously rotating resupply hopper attached to the cage exchanger. Opposing cages are preferably resupplied simultaneously in order to maintain dynamic balance within the rotating equipment.

Although the alternate food dispensing systems are shown in separate use, they could be incorporated within one biocentrifuge system as a primary and backup feeding mode.

In operation, rotatable centrifuge 10 is spun by hub assembly 18, and thereafter animal specimen cage exchanger 20 is driven by hub assembly 22 via clutch 24 at a slow acceleration until its speed equals that of centrifuge 10. The clutch is properly indexed so that when the cage exchanger and centrifuge are rotating at the same velocity, the ends of exchanger arms 28 will be aligned with removal pins 58 attached to a preselected pair of opposed specimen cages 40. To remove the cages, the removal cones are initially advanced to mate with slotted heads 59, are again advanced in order to separate latch hook 57 from latch keeper 68, latch 56 and cone 32 are rotated about 90 degrees, the cage removal arms are retracted, the cage exchanger is braked to a stop, and the specimens are then withdrawn. New specimens can be placed within the thus removed cages and the reverse procedure executed after the cage exchanger has been reaccelerated to the same velocity as the centrifuge. The cages are removed in opposing pairs by the concentrically rotating exchanger to maintain the rotational balance of the biocentrifuge.

Individual caged specimens can be viewed in image rotator 17 along the axis of rotation. Rotator 17 receives an image of a caged animal via reflections from a rotating mirror 46 beneath and adjacent to the rotator and one of the cage mirrors 44 associated with each cage. By rotating at the same speed as the caged mirrors, the image rotator is able to unscramble the rotating image of each caged animal and provide a clear view of the same. The mirror 46 can be either mounted on the exchanger or attached to the rotator via an intermediate mirror spin drive assembly (not shown).

The centrifuge is preferably supported at the small diameter of a Spacelab end cone by its support legs.

The biocentrifuge system described hereinabove provides long-term artificial gravity conditions aboard an orbiting spacecraft for a plurality of individually caged animal specimens, e.g. rodents. The viewing window, image rotator and optical mirror provide means for optically observing the animal specimens on a selective real time basis. The continuously spinning centrifuge and rotatable cage exchanger provide for the removal and replacement of cages without impacting upon the remaining cages and specimens. Furthermore, the continuously spinning centrifuge system which carries the plurality of specimen cages provides for automatic waste collection and water and food replenishment from remote storage facilities.

In the embodiment shown, the biocentrifuge system is designed to accommodate 16 rats and has a diameter scaled for utilization in a Spacelab. As such it utilizes the Spacelab conical bulkhead configuration and is designed for a long duration in orbit while remaining unattended.

Industrial Applicability

Although the biocentrifuge system of the present device is expressly disclosed for use in space, the basic apparatus can be utilized in any centrifuge system in which it is desired to remove a specimen cage or other holding container from a rotating centrifuge or other structure without stopping the centrifuge and impacting upon the non-selected containers. Similarly, the system could be applied to other analogous rotating systems.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A centrifuge system comprising:
   (a) a frame having a plurality of containers removably and replaceably mounted about its periphery, said frame having a stationary inoperative mode and a rotating operational mode;
   (b) a rotatable device positioned adjacent to said frame;
   (c) means for rotating said frame and means for rotating said device;
   (d) said device including means for removing and replacing at least one of said containers from said frame while said frame is rotating in its operational mode; and
   (e) means for supporting said frame and said device.

2. A centrifuge system in accordance with claim 1 wherein said device and frame are independently rotatable about concentric axes, said means for rotating said frame and said means for rotating said device being adapted to simultaneously rotate said device and frame about said axes at the same speed.

3. A centrifuge system in accordance with claim 1 wherein said means for supporting said frame and said device comprise a plurality of support legs, a plurality of radial support spokes, and a substantially conical support member attached to said spokes.

4. A centrifuge system in accordance with claim 1 wherein said means for rotating said frame and said means for rotating said device comprise a motor, a gear, a first spin axle hub assembly, a clutch connected to said first spin axle hub assembly, and a second spin axle hub assembly attached to said clutch, whereby said first spin axle hub assembly is adapted to rotate said frame and said second spin axle hub assembly is adapted to rotate said device.

5. A centrifuge system in accordance with claim 1 wherein said frame is substantially circular and each of said containers is located on said periphery opposite to an identical container.

6. A centrifuge system in accordance with claim 5 wherein said removing and replacing device comprises means for removing a pair of said opposed containers.

7. A centrifuge system in accordance with claim 1 wherein said containers comprise animal specimen cages.

8. A centrifuge system in accordance with claim 7 further comprising an image rotator for selectively optically observing a predetermined one of said specimens.

9. A centrifuge system in accordance with claim 7 further comprising spring loaded latches for securing each of said cages to the periphery of the rotatable frame, each of said latches having a latch hook adapted for engagement with a latch keeper on said frame.

10. A centrifuge system in accordance with claim 9 wherein said device is a specimen cage exchanger comprising a plurality of exchanger arms having a central portion and two peripheral ends, means for driving said arms, a rotatable cage removal cone positioned at each of said peripheral ends of said arms, and means for driving said cones such that said cones are adapted to drive said latch hooks away from said keepers.

11. A centrifuge system in accordance with claim 10 further comprising a specimen waste collection system supported beneath each of said cages, a food dispensing system and liquid supply system.

12. A biocentrifuge system for subjecting animals to artificial conditions in space, said system comprising:
   (a) a frame having a plurality of cages removably and replaceably mounted about its periphery, said frame having a stationary inoperative mode and a rotating operational mode;
   (b) a rotatable cage exchanger positioned within said frame;
   (c) means for rotating said frame and means for rotating said cage exchanger;
   (d) said cage exchanger comprising means for selectively removing and replacing at least a predetermined one of said cages from said frame while said frame is rotating in its operational mode; and
   (e) means for supporting said frame and said cage exchanger.

13. A biocentrifuge system in accordance with claim 12 wherein said support means comprises a plurality of support legs, a plurality of radial support spokes, and a substantially conical support element attached to said spokes.

14. A biocentrifuge system in accordance with claim 12 wherein said means for rotating said frame and said means for rotating said device comprise a motor, a gear, a first spin axle hub assembly, a clutch attached to said first spin axle hub assembly, and a second spin axle hub assembly attached to said clutch, whereby said first spin axle hub assembly is adapted to rotate said frame and said second spin axle hub assembly is adapted to rotate said cage exchanger.

15. A biocentrifuge system in accordance with claim 12 further comprising a specimen waste collection system, a food dispensing system and a liquid supplying system.

16. A biocentrifuge system in accordance with claim 15 wherein said waste system comprises a belt for conveying said waste and a waste collector storage compartment.

17. A biocentrifuge system in accordance with claim 15 wherein said liquid supplying system comprises a drinking pot and a water heater.

18. A biocentrifuge system in accordance with claim 15 wherein said food dispensing system comprises a partially capped food pellet delivery tube.

19. A biocentrifuge system in accordance with claim 15 wherein said food dispensing system comprises a feed hopper.

20. A biocentrifuge system in accordance with claim 15 further comprising a substantially cylindrical image rotator for selectively optically observing a predetermined one of said specimens, said image rotator positioned adjacent the center of said frame, said system further comprising a rotating mirror positioned beneath and adjacent to said rotator.

21. A biocentrifuge system in accordance with claim 20 wherein each of said cages comprises a transparent observation window and wherein a mirror is angularly positioned adjacent each of said cages.

22. A biocentrifuge system in accordance with claim 10 wherein said frame and said exchanger are independently rotatable about concentric axes, said means for rotating said frame and said means for rotating said cage exchanger being adapted to simultaneously rotate said device and frame about said axes at the same speed.

23. A biocentrifuge system in accordance with claim 22 wherein said frame is substantially circular and each of said mounted cages is opposed by an identical cage mounted on the periphery of said frame.

24. A biocentrifuge system in accordance with claim 23 wherein said exchanger can simultaneously remove a pair of opposed cages.

25. A biocentrifuge system in accordance with claim 22 wherein each of said cages further comprises a spring loaded latch for securing said cage to the periphery of the rotatable frame, each of said latches including a latch hook adapted for engagement with a latch keeper on said frame.

26. A biocentrifuge system in accordance with claim 25, said cage exchanger comprising a plurality of exchanger arms, each having a central portion and peripheral ends, means for driving said arms, a rotatable cage removal cone positioned at the peripheral end of each arm and means for driving said cones such that said cones are adapted to drive said latch hooks away from said keepers.

* * * * *